United States Patent [19]

Miyazawa

[11] 4,015,204

[45] Mar. 29, 1977

[54] METHOD OF TELECOMMUNICATIONS

[76] Inventor: Kuniaki Miyazawa, 1548 Nishioizumicho, Nerimaku Tokyo, Japan, 177

[22] Filed: Aug. 8, 1975

[21] Appl. No.: 603,227

[30] Foreign Application Priority Data

Aug. 21, 1974 Japan .............................. 49-94943
Sept. 6, 1974 Japan ............................ 49-102823

[52] U.S. Cl. ............................................... 325/38 R
[51] Int. Cl.² .......................................... H04B 1/00
[58] Field of Search ................ 325/38 R, 38 A, 39, 325/40, 26; 178/66 R, 66 A, 68, 67; 332/31 R, 31 T

[56] References Cited

UNITED STATES PATENTS

| | | | |
|---|---|---|---|
| 3,497,618 | 2/1970 | Thayer | 325/38 R X |
| 3,885,217 | 5/1975 | Cintron | 325/39 X |
| 3,919,641 | 11/1975 | Kurokawa | 178/66 R X |

*Primary Examiner*—Richard Murray
*Attorney, Agent, or Firm*—William D. Hall; Geoffrey R. Myers

[57] ABSTRACT

A method of telecommunications involving a train of binary signals. A predetermined number (a frame) of the signals is stored in a first register. There are second, third and fourth registers, each of which stores a different number of binary digits, but the total digits stored in the second, third and fourth registers equals the total storage capacity of the first register. The digits are read out of the first register into the second, third and fourth registers. There are three carrier waves for the outputs of the second, third and fourth registers respectively. The ratio of the frequency of a carrier wave to the number of binary signals in the group that is complementary to that particular carrier wave is the same for each carrier wave and its complementary group of binary signals. The three carrier waves are amplitude modulated by the contents of their complementary registers so that each cycle of each carrier wave represents a single binary digit. The three carrier signals may be fed into a common transmission line and delivered to the receiving location. After the signals have been fed out of the first register and are being held in the second, third and fourth registers, the first register is being refilled with the next frame of binary signals. Moreover, after the signals in the second, third and fourth registers have modulated their respective carrier waves, they receive binary signals (representing the second frame) from the first register and those binary signals thereafter modulate their respective carrier waves accordingly. The process thus repeats itself from one frame to the next of the incoming binary signals.

At the receiver the three carrier waves are demodulated and the contents of said second register (at the transmitter) are stored in a similar register (A) at the receiver. The contents of the third register (at the transmitter) are stored in a similar register (B) at the receiver, and the contents of the fourth register (at the transmitter) are stored in a similar register (C) at the receiver. The outputs of the said three registers (A, B and C) at the receiver are then read-out into an output register which has the same digit capacity as the said first register (at the transmitter). As the signals are fed to the output register, the next frame of the train of binary signals are entered into the first three named registers of the receiver, and are then fed to the output register after the first frame of binary signals has been read out of the output register. The original train of binary signals is reconstructed at the receiver from said output register as the frames of binary signals are fed out one after another.

18 Claims, 18 Drawing Figures

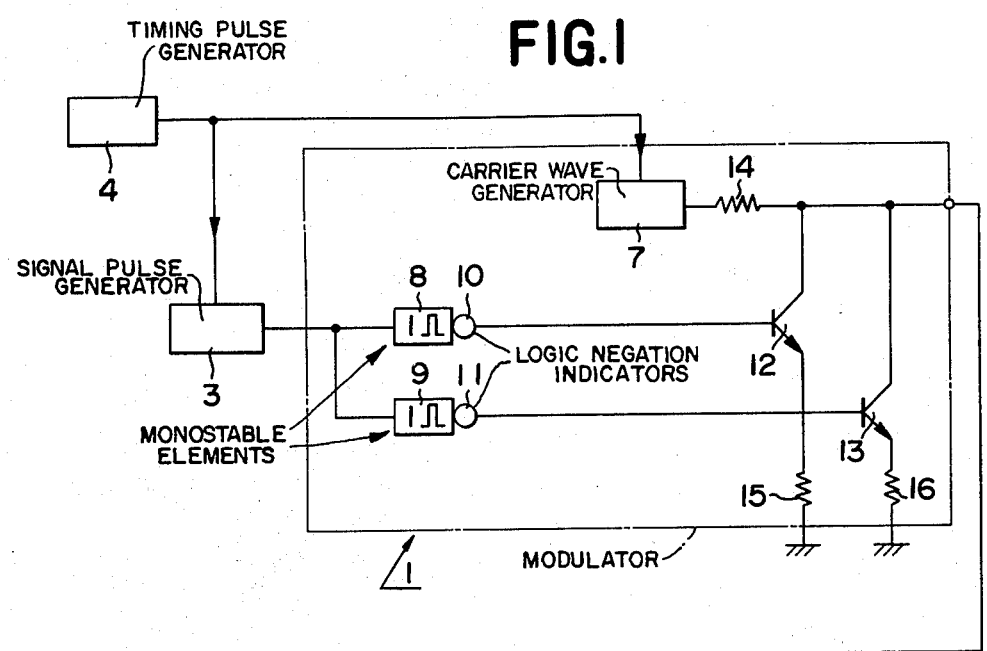
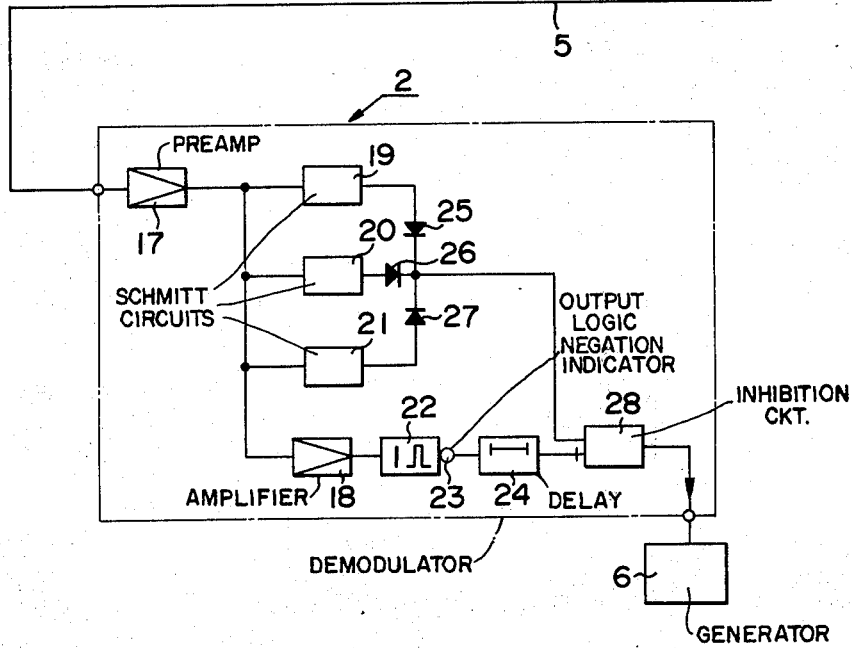
FIG.1

FIG.10
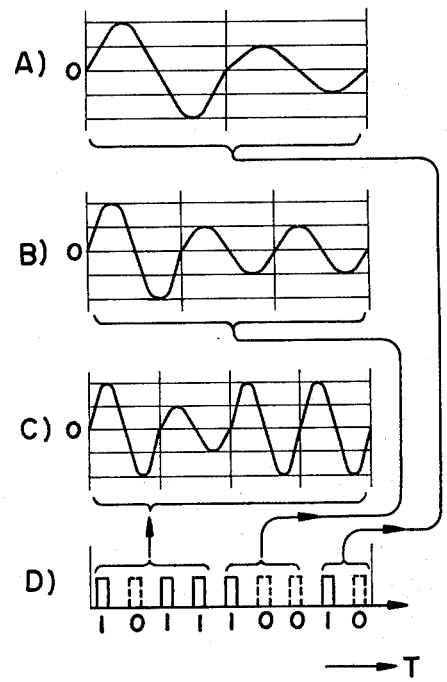
FIG.15
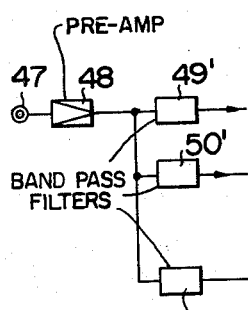
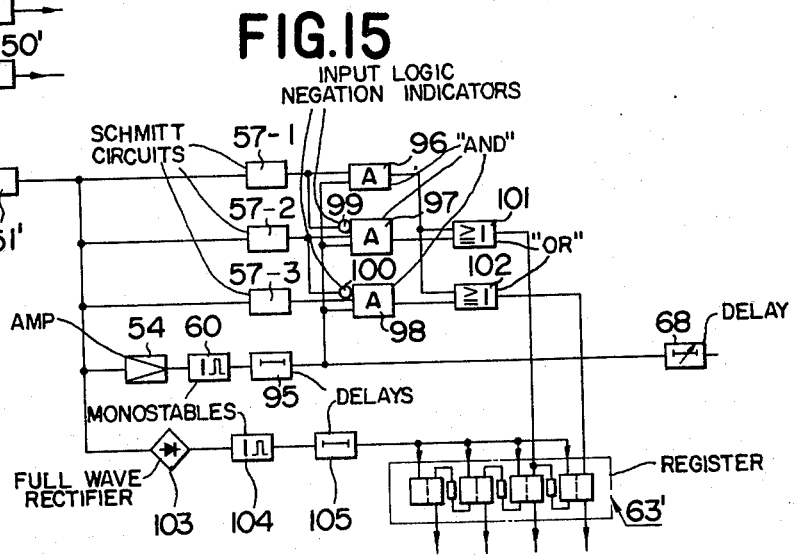

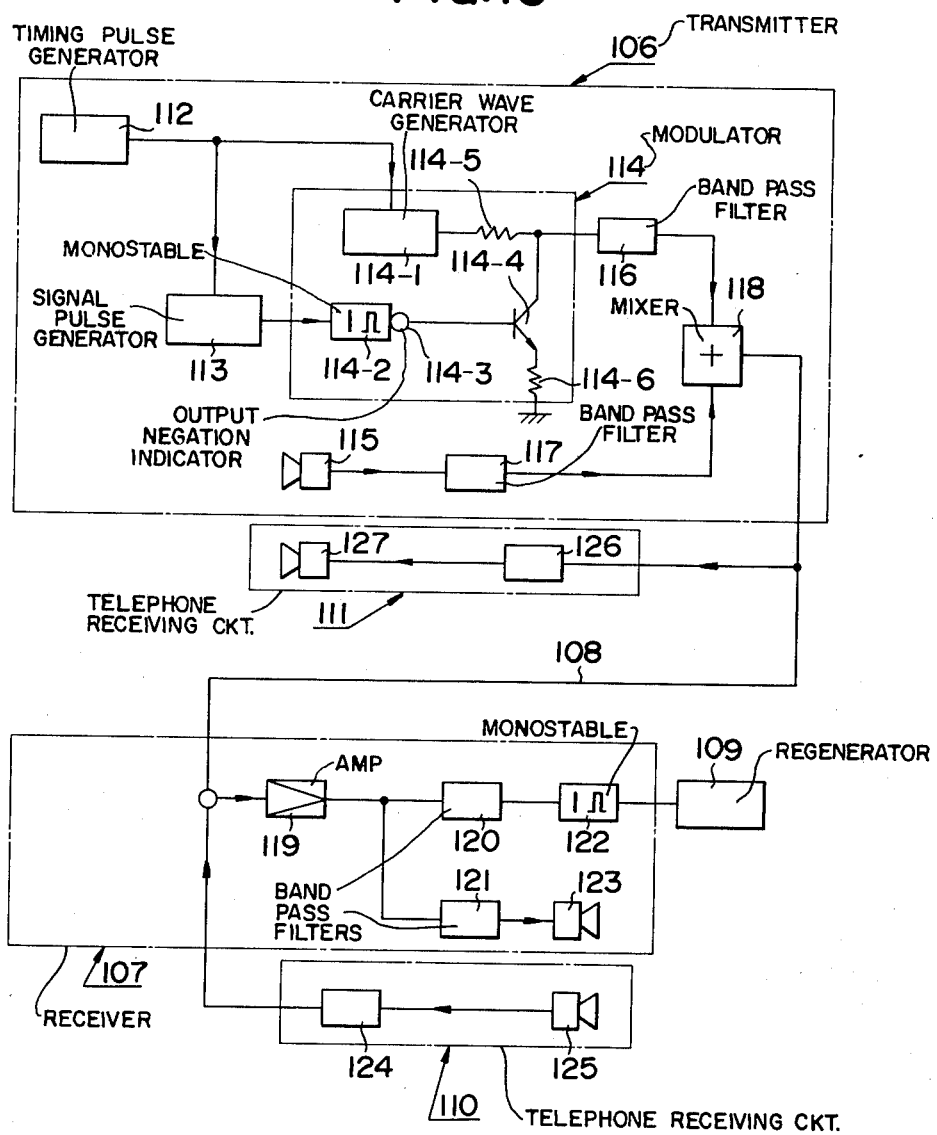

METHOD OF TELECOMMUNICATIONS

BACKGROUND OF THE INVENTION

Today, the volume or number of the information data reaches to astronomical figures, therefore we are in need of more capable and efficient data communications technique.

Therefore, many methods or technique have been proposed for example, use of very high or ultra high frequency waves, many kind of multiplex communications, and various kinds of modulation techniques.

None the less, the frequency band which is assigned for specified communications is very strictly limited, for example, each public telephone line has a band-pass filter the upper cutoff frequency of which is about 3,000 Hz, therefore we can not use carrier waves the frequency of which is than 3,000 Hz.

Therefore, the maximum speed of telecommunications through a telephone line was usually limited not more than 1,200 baud.

For this reason, the transmission of telefacsimile any small figure through the public telephone line using a simple device requires a lot of time. Of course high speed telefacsimile machines are provided, but these are very intricate and expensive, because it is necessary to use a kind of complicated electronic data processing machines for constriction of information.

SUMMARY OF THE INVENTION

The principal object of the present invention is to provide a method of high speed and high density data communications.

The second object of the present invention is to provide a method of telecommunications applying no side band but carrier waves.

The third object of the present invention is to provide a method of telecommunications which is capable of sending the signal pulses at high speed which is far higher than well known critical transmission speed in assigned line or frequency band.

The fourth object of the present invention is to provide a method of telecommunications with which we can transmit the signal pulses together with audio signals or the likes through a public telephone line or the likes.

The fifth object is to provide a new modulation technique which is able to assort with all sorts of well known modulation technique.

This invention is very available for high speed telefacsimile, narrow band television, video-telephone, and all sorts of high speed data communications.

In one form of the invention there is a train of binary signals which is to be transmitted from the transmitting location to the receiving location. This train of binary signals is divided into groups (frames) with a different number of binary signals in each group (for example, there may be three groups which may have two, three and four binary signals respectively). There are a plurality of separate carrier waves, one for each of said groups of binary signals. The ratio of the frequency of a carrier wave to the number of binary signals in the group that is complementary to that particular carrier wave is the same for each carrier wave and its complementary group of binary signals. Each carrier wave is amplitude modulated in accordance with its complementary group of binary signals so that each cycle of that carrier wave represents one binary signal of that particular group.

The modulated carrier waves are transmitted to a receiving location in any well-known manner.

At the receiving location the plural carrier waves are demodulated to separately extract from the separate carrier waves the binary signals which modulated those waves. Hence, the system has now produced a plurality of separate groups of binary signals. These separate groups are then combined into a single train of binary signals to thereby reconstruct one frame of the original train of binary signals which was fed into the system at the transmitting location. Additional frames are serially reconstructed thereby completely reconstructing the original train of binary signals.

BRIEF DESCRIPTION OF THE DRAWINGS

FIG. 1 is a schematic diagram of a data communication system in accordance with one embodiment of the invention.

FIG. 10 is a wave form diagram which shows the carrier waves which are modulated by means of the modulator shown in FIG. 9.

FIG. 15 is a schematic diagram of a demodulator making a pair with said modulator shown in FIG. 14.

FIG. 16 is a schematic diagram of a communication system which is able to transmit desired pulses together with desired audio signals in accordance with the invention.

DETAILED DESCRIPTION OF PREFERRED EMBODIMENTS

Figure 2:
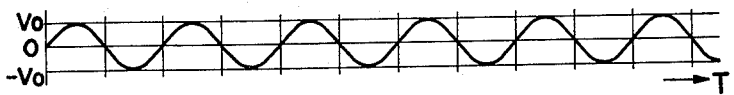
FIG. 2 is a wave form diagram showing the standard wave form of carrier waves.

Referring particularly to FIG. 1 of the drawings, a data communication system in accordance with one embodiment of the invention comprises a modulator 1, a demodulator 2, a signal pulse generator 3, a timing pulse generator 4, a transmission line 5 and a regenerator 6.

The signal pulse generator 3, for example, may be an analog-to-digital converter, facsimile transmitting device or an input unit to a computer, which is able to generate a ternarycoded signal pulse train synchronized with the timng pulses which are transmitted by the timing pulse generator 4.

The modulator 1 is composed of a carrier wave generator 7, two monostable elements 8 and 9 both of which have their own output logic negation indicators 10 and 11 respectively, two switching transistors 12 and 13, and three resistors 14, 15 and 16.

The carrier wave generator 7 consists of a T bistable element and a band-pass filter (not shown). The wave form of the carrier waves is a sine curve and the frequency is equal to the frequency of said timing pulses.

While the monostable elements 8 and 9 are not triggered on, both of the switching transistors 12 and 13 are conducting all the time, therefore, the amplitude of the carrier waves is on the lowest level as shown in FIG. 2.

When one of said ternary-coded signal pulses which represents a logical 0 is generated, neither of the monostable elements 8 and 9 is triggered on, but a signal pulse meaning a logical 1 triggers on the monostable element 8 to output a pulse the length of which is equal to one cycle of the carrier waves, and this pulse turns off the switching transistor 12 through the output logic negation indicator 10.

In other words, when the monostable element 8 is triggered on, the switching transistor 12 ceases to conduct, and remains in a non-conducting state during one cycle of the carrier waves. Therefore, the amplitude of the carrier waves doubles.

A signal pulse representing a logical 2 triggers on both of the monostable elements 8 and 9, therefore, both of switching transistors 12 and 13 are kept in the non-conducting state during one cycle of the carrier waves, therefore the amplitude of the carrier waves trebles.

Figure 3:
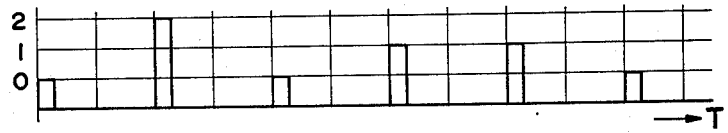
FIG. 3 shows a train of signal pulses.
Figure 4:
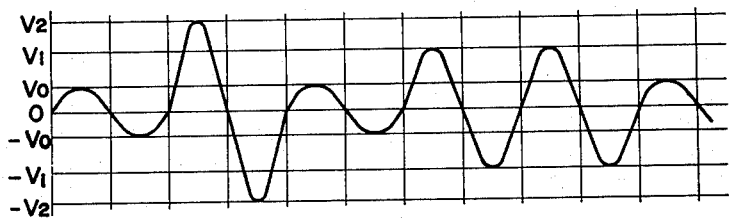
FIG. 4 is a wave form diagram which shows the carrier waves which have been modulated with signal pulses shown in FIG. 3 in accordance with the invention.

Therefore, the carrier waves, for example, are modulated as shown in FIG. 4, with the signal pulses which are shown in FIG. 3.

Then, the modulated carrier waves are sent to desired receiving apparatus through the transmission line 5.

The demodulator 2 is composed of a preamplifier 17, a branch amplifier 18, Schmitt circuits 19, 20 and 21, a monostable element 22, an output logic negation indicator 23, a delay circuit 24, diodes 25, 26 and 27, and an inhibition circuit 28.

The peak voltage of the latter half cycle of the carrier waves carrying a logical 0 does not trigger on the Schmitt circuits 19 and 20 but it does trigger Schmitt circuit 21, the one carrying a logical 1 does not trigger on the Schmitt circuit 19 but does trigger Schmitt circuits 20 and 21, and the one carrying a logical 2 triggers all the Schmitt circuits 19, 20 and 21.

And the voltage of the output pulses of the Schmitt circuit 19 is the highest of all others, the one of the Schmitt circuit 20 is the midmost and the one of the Schmitt circuit 21 is the lowest.

On the one hand, the output signals of the preamplifier 17 are amplified by the branch amplifier 18, and are supplied to the monostable element 22.

The monostable element 22 is triggered on at the every beginning points of the latter half cycle of the carrier waves, and outputs a train of short pulses the frequency of which is equal to the frequency of the carrier waves.

These pulses are converted by the output logic negation indicator 23, delayed by the delay circuit 24, and inputed to the inhibition circuit 28 as the inhibiting input. The amplitude of the carrier waves reaches to its peak value during the latter half of each cycle, because the delay time of the delay circuit 24 is equal to one fourth of one cycle of the carrier wave.

Therefore, the inhibition circuit 28 instantaneously opens whenever the amplitude of the carrier wave reaches to its peak value in the latter half of the cycle, and lets the output pulses of the Schmitt circuits 19 to 21 pass through. These output pulses drive the regenerator 6 to regenerate the signals, patterns or the likes which had been transmitted by means of above-mentioned apparatuses.

The number of the monostable elements of the modulator 1 and the Schmitt circuits of the demodulator 2 should be determined in accordance with the mode and kind of the coding of signals.

Figure 5:
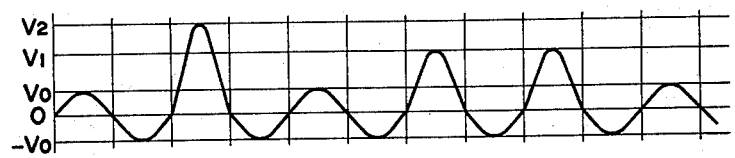
FIG. 5 is another wave form diagram which shows the carrier waves which have been modulated in another mode with the same signal pulses in accordance with the invention.

And, in the above-mentioned embodiment, the length of the outputs of the monostable elements 8 nd 9 is equal to the length of one cycle of the carrier wave, but may be equal to the length of a half cycle of the carrier wave. In the latter case, the carrier wave is modulated as shown in FIG. 5 with the signal pulses as shown in FIG. 3.

Figure 6:
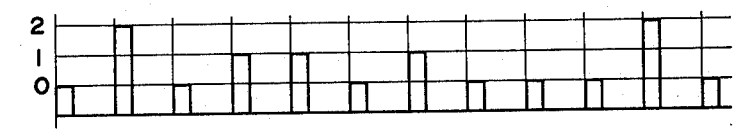
FIG. 6 shows a train of high frequency signal pulses.
Figure 7:
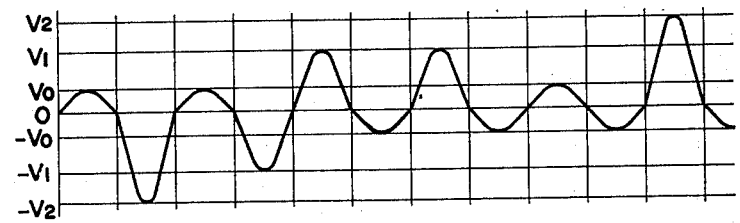
FIG. 7 is a wave form diagram which shows the carrier waves which have been modulated with the signal pulses shown in FIG. 6.
Figure 8:
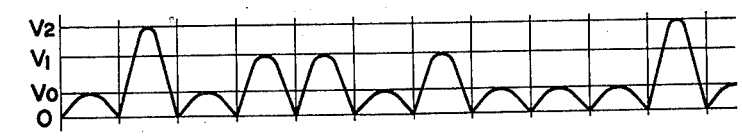
FIG. 8 is a wave form diagram which shows demodulated carrier waves on the first phase of the demodulation method in accordance with the invention.

Furthermore, if the high frequency signal pulses shown in FIG. 6 should be transmitted, it is possible to modulate the carrier wave with said high frequency signal pulses as shown in FIG. 7. And, the carrier waves which are modulated in above-mentioned mode are converted into the wave forms shown in FIG. 8 by means of full-wave rectification. After the waves of FIG. 8 are received they are demodulated and amplified. By means of this method, the transmission speed increases twofold, but it requires a transmission line of good quality.

Generally, the modulation method which is shown in FIG. 4 is recommended on occasions when the transmission line is of poor quality, for example a public telephone line (or the like), because any fluctuation in D.C. never is generated in this case.

In this case, some spurious wave peaks may appear in the first half cycles of the carrier wave carrying a logic signal frequently, especially at the low amplitude wave following after the high amplitude wave, therefore the demodulation should be done at every latter half cycles of the carrier wave carrying a logic signal.

Figure 9:
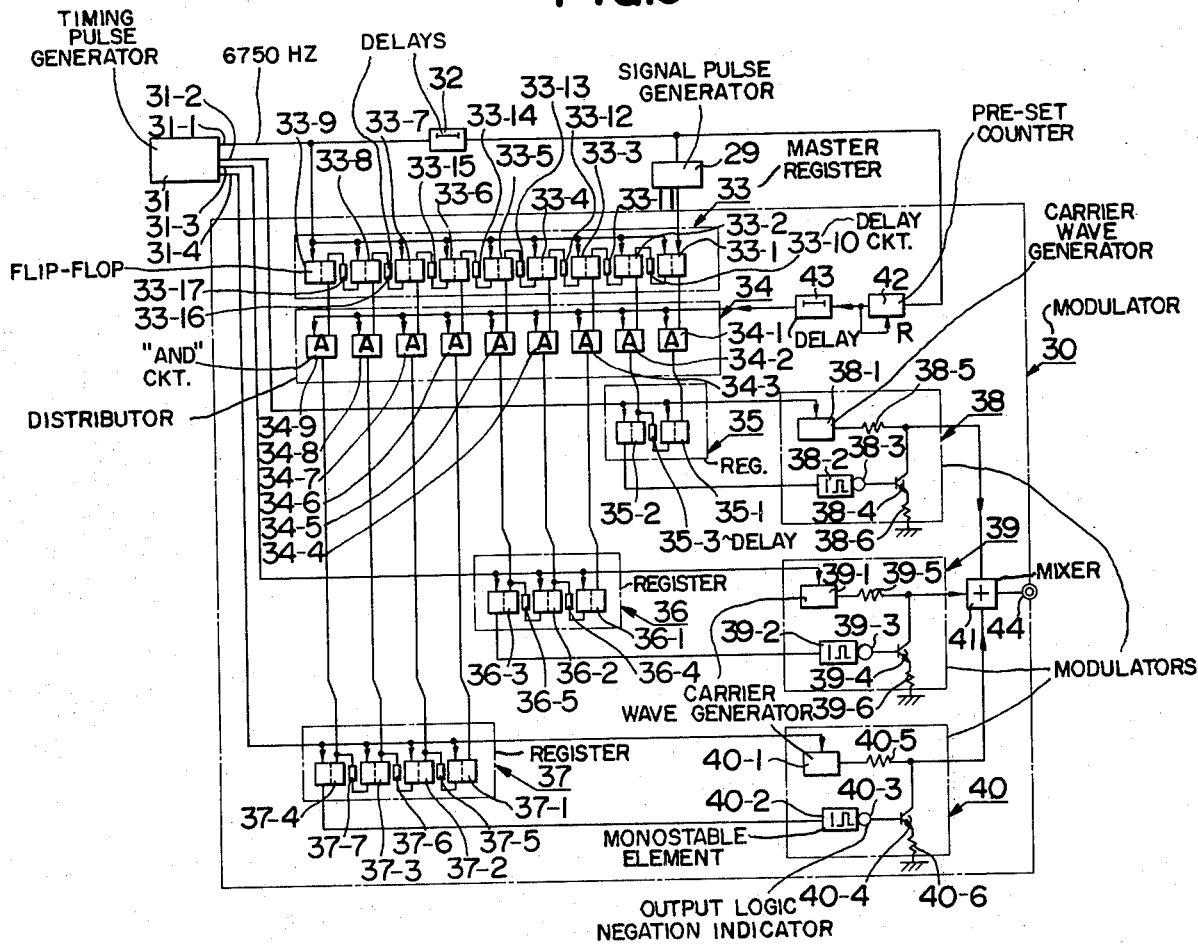
FIG. 9 is a schematic diagram of the transmission apparatus of the high speed data communication system in accordance with another embodiment of the invention.

FIG. 9 shows an embodimnt of a transmission apparatus which is used for multiplex transmission using plural carrier waves each of which has its own frequency.

In the FIG. 9, 29 is a signal pulse generator which generates a binary coded signal pulse train, 30 is a modulator, 31 is a timing pulse generator, and 32 is a delay circuit.

And the modulator 30 is composed of a master register 33, a distributor 34, supplementary registers 35, 36 and 37, modulators 38, 39 and 40, a mixing circuit 41 a preset counter 42, a delay circuit 43, and an output terminal 44.

The timing pulse generator 31 has four output terminals 31-1, 31-2, 31-3 and 31-4, from which the 6,750, 1,500, 2,250 and 3,000 Hz timing pulse trains are delivered respectively.

The master register 33 is a nine digit shift register which is composed of nine bistable elements, flip-flops 33-1 to 33-9, and eight delay circuits 33-10 to 33-17, and the distributor 34 is a data processing gate circuit comprising nine AND circuits 34-1 to 34-9.

The supplementary register 35 is a two digit shift register composed of two bistable elements 35-1 and 35-2 and one delay circuit 35-3, on which the data stored on the lower two digits of the master register 33 are removed and stored.

The supplementary register 36 is a three digit shift register composed of three bistable elements 36-1, 36-2 and 36-3 and two delay circuits 36-4 and 36-5, on which the data stored on three digits of the master register 33 are removed and stored.

The supplementary register 37 is a four digit shift register composed of four bistable elements 37-1, 37-2, 37-3 and 37-4 and three delay circuits 37-5, 37-6 and 37-7, on which the data stored on the upper four digits of the master register 33 are removed and stored.

The frequency of the timing pulses generated at the output terminal 31-1, 6,750 Hz, is equal to the sum total of the frequencies of the timing pulses generated at other output terminals.

Moreover, the ratio of the frequency of a carrier wave to the number of binary signals in the register associated with that carrier wave is the same for each carrier wave and its complementary register. Explaining this further, the carrier wave on wire 31-2 has a frequency of 1,500 Hz; and it is associated with a two digit register 35. The carrier wave on wire 31-3 has a frequency of 2,250 Hz and it is associated with a three digit register 36. Additionally, the carrier wave on wire 31-4 is 3,000 Hz, and it is associated with the four digit register 37. Thus $$(1,500/2) = (2,250/3) = (3,000/4) = 750.$$

As will appear later, the above relationship permits each cycle of each of the three carrier waves to be amplitude modulated in accordance with one digit of the train of digits fed into the system by signal pulse generator 29.

The 6,750 Hz timing pulses driven by used on the one hand as shift pulses for the master register 33, and on the other hand as timing pulses to control the signal pulse generator 29 through the delay circuit 32, and further as instruction pulses to remove the memory of the master register 33 to the supplementary registers 35, 36 and 37 through the preset counter 42 and the delay circuit 43.

The signal pulse generator 29 is, for example, a facsimile transmitter which scans a picture and converts it into a synchronous binary coded pulse train.

In concrete terms, said facsimile transmitter has an optical detector, and which can convert and transmit binary signal pulses synchronizing with the 6,750 Hz timing pulses, and showing whether brightness of scanning points on the picture is under a certain threshold level or not. The preset counter 42 is made to transmit a sharp pulse every nine input pulses.

The output pulses generated by the signal pulse generator 31 are inputed into the master register 33 which is a nine digit shift register, and the moment nine bits of said output pulses are written down into the master register 33, they are removed to the new address in the supplementary registers 35, 36 and 37 by an instruction pulse which is transmitted by the preset counter 42.

The supplementary registers 35, 36 and 37 are drivenby the 1,500, 2,250 and 3,000 Hz timing pulse respectively, therefore, they deliver the data stored in series respectively, exactly within said one frame of time, while the next nine signal pulses are inputed into the master register 33. The timing pulses synchronize and control the frequency of the operations described in this paragraph.

The modulators 38, 39 and 40 are similar to each other, and the modulator X (X stands for 38, 39 or 40) consists of a carrier wave generator X-1, a monostable element X-2, an output logic negation indicator X-3, a switching transistor X-4, and resistors X-5 and X-6.

But, the carrier wave generators 38-1, 39-1 and 40-1 generate the 1,500, 2,250 and 3,000 Hz carrier waves respectively, and the preset times of the monostable elements 38-2, 39-2 and 40-2 are equal to 1/1,500, 1/2,250, and 1/3,000 sec respectively.

The action of modulators 38, 39 and 40 is similar to the above mentioned modulator 1 (FIG. 1), for example, when the output of the supplementary register 36 is a 0, the switching transistor 39-4 is conducting, therefore the amplitude of the carrier waves is on the low level, but when the output of the supplementary register 36 is a 1, the monostable element 39-2 is triggered on, the switching transistor 39-4 ceases to conduct, and therefore the amplitude of the carrier waves increases These switchings of the amplitude of the carrier waves are made at the every two zero-cross points of the carrier waves, in other words at the moment the instantaneous voltage of the carrier wave reaches to zero in the increasing terms.

Therefore, the carrier wave forms between said zero-cross points are always very similar to sine curves, but their amplitudes depend on corresponding output signals transmitted by the corresponding supplementary register.

The modulated carrier waves at the outputs of said modulators 38, 39 and 40 are shown in FIG. 10. Thereafter the three modulated carrier waves are mixed at the mixing circuit 41, and transmitted to a receiving station shown in FIG. 11 through a telephone line or the like.

Figure 11:
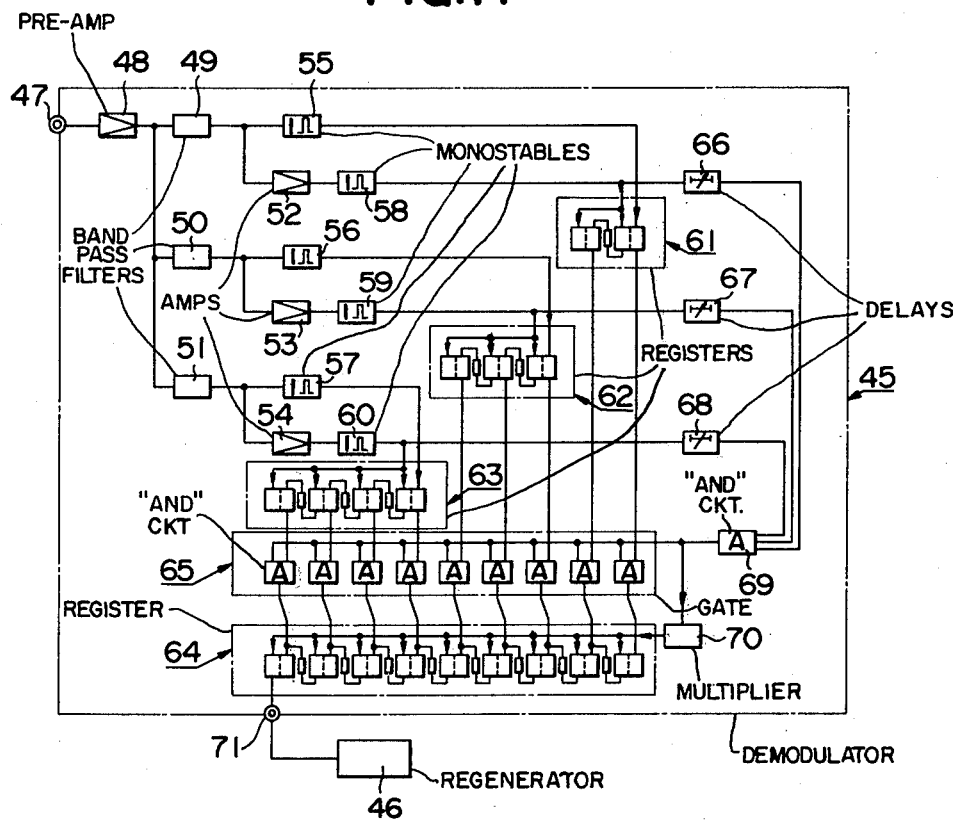
FIG. 11 is a schematic diagram of the demodulator making a pair with said modulator shown in FIG. 9.

In the FIG. 11, 45 is a demodulator and 46 is a regenerator, and the demodulator 45 is composed of an input terminal 47, preamplifier 48, bandpass filters 49, 50 and 51, amplifiers 52, 53 and 54, monostable elements 55 to 60, receiving registers 61, 62 and 63, a final register 64, a data processing gate circuit 65, delay circuits 66, 67 and 68, AND circuit 69, a multiplier 70 and an output terminal 71.

And the receiving registers 61, 62 and 63 are constructed likewise to the above-mentioned supplementary registers 35, 36 and 37 respectively. The final register 64 is constructed likewise to the master register 33, and also the data processing gate circuit 65 is constructed likewise to the distributor 34.

Figure 12:
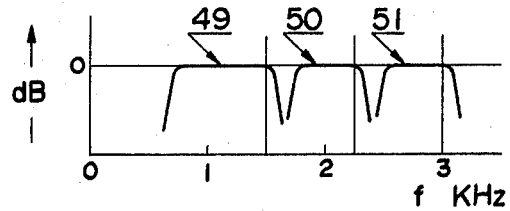
FIG. 12 and 13 are graphs which shows the characteristics of the bandpass filters which might be used in the said demodulator shown in FIG. 11.

The dB/frequency characteristics of the band-pass filters are shown in FIG. 12, and the upper cut-off frequency of the band-pass filters 49, 50 and 51 are 1,500, 2,250 and 3,000 Hz respectively.

Therefore, all of the band-pass filters act as frequency discriminators, in other words they separate the mixed three carrier waves.

All of the monostable elements 55, 56 and 57 have the same threshold level and short preset time and are not triggered on by a peak voltage of the smaller amplitude of the carrier wave, but by a peak voltage of larger amplitude than the normal peak amplitude of the carrier wave which sometimes occurs of the carrier wave which sometimes occurs at the latter half cycle of the carrier wave.

In other words, the monostable elements 55, 56 and 57 demodulate the corresponding carrier waves which are modulated by above-mentioned modulators 38, 39 and 40.

On the other hand, the separated carrier waves are amplified by the amplifiers 52, 53 and 54 respectively, and trigger on the monostable elements 58, 59 and 60.

Every one of the monostable elements 58, 59 and 60 is triggered on at every other zero-cross point of the corresponding carrier wave, and transmits a sharp pulse train, which is used as shift pulses for the receiving registers 61, 62 and 63.

Therefore, the signal pulses which are demodulated by the monostable elements 55, 56 and 57 are stored on the receiving registers 61, 62 and 63 respectively.

On the other hand, the output pulses of the monostable elements 58, 59 and 60 are inputed into the AND circuit 60, through the delay circuits 66, 67 and 68 respectively.

The delay circuits 66, 67 and 68 are used to synchronize the output pulses of the each one of the carrier waves, 1,500, 2,250 and 3,000 Hz carrier waves each other.

As the transmitting velocities of said carrier waves may differ from each others, therefore the output pulses of the monostable elements 58, 59 and 60 are not always synchronizing, hence the delay circuits 66, 67 and 68 are provided to compensate for the difference of the transmitting speed or phase of the carrier waves and synchronize the said output pulses.

The period between every output pulse of the AND circuit 69 is equal to the above-mentioned one frame of time, if frequency offset does not occur in the line. Therefore, the nine bits of the transmitted signals are stored on the receiving registers 61, 62 and 63 in said period.

Even if the frequency offset occurs in the line, the above-mentioned storing is carried out without any difficulty or failure.

At the end of said period, the stored data on the receiving registers 61, 62 and 63 are removed to the final register 64 through the date processing gate circuit 65.

The multiplier 70 transmits 6,750 Hz timing pulses synchronizing with the output pulses of the AND circuit 69, which are used as shift pulses for the final register 64.

Therefore, the stored data are transmitted to the regenerator 46 in series, within the next one frame of time, while the next nine bit of the signals will be received and stored on the receiving registers 61, 62 and 63.

Therefore, by means of this embodiment, the data may be transmitted through a telephone line with a frequency band of 6,750 Hz, without fail.

Figure 13:
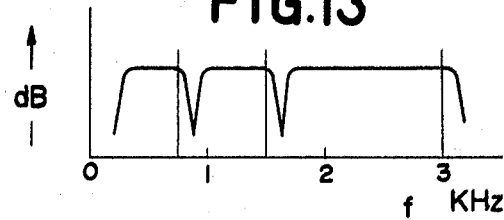

In this embodiment the 1,500, 2,250 and 3,000 Hz carrier waves are used, but when the line of poor quality must be used, for example a long distance telephone line, it is suggested to use 750, 1,500 and 3,000 Hz carrier waves. And in this case the band-pass filters should be given the dB/frequency characteristics shown in FIG. 13, and the 750, 1,500 and 3,000 Hz upper cutoff frequency respectively.

Figure 14:
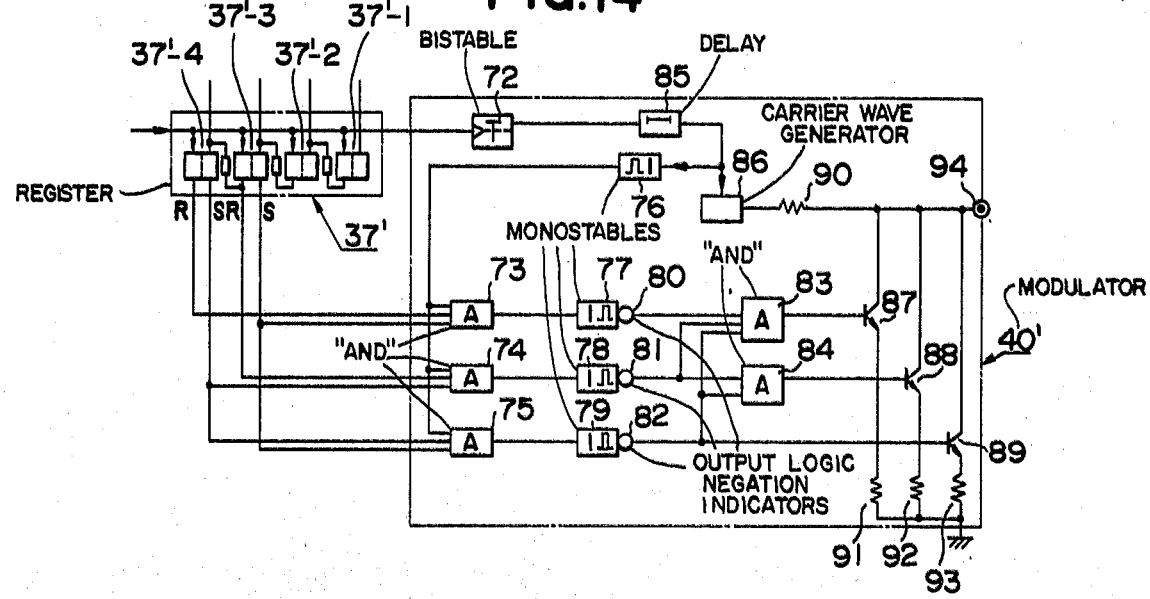
FIG. 14 is a schematic diagram of another modulator in accordance with the invention.

FIG. 14 shows a modulator which allows to transmit the gray code.

In the FIG. 14, 37' is a supplementary register which is similar to the supplementary register 37 shown in FIG. 9, 40' is a modulator which is used in place of the modulator 40 of FIG. 9.

In this case, the brightness of the picture at a scanning point is shown with two bit of binary codes as shown in Table 1.

Table 1

| Brightness | Code | T bistable element | |
|---|---|---|---|
| | | 37' – 4 | 37' – 3 |
| white | 00 | R | R |
| light gray | 01 | R | S |
| dark gray | 10 | S | R |
| black | 11 | S | S |

And all the supplementary registers have an even number of digits, as a matter of fact, twice as many digits as the supplementary registers shown in FIG. 9, and on a pair of which the brightness data are stored.

The modulator 40' is composed of a T bistable element 72, AND circuits 73, 74 and 75, monostable elements 76, 77, 78 and 79, output logic negation indicators 80, 81 and 82, AND circuits 83 and 84, a delay circuit 85, a carrier wave generator 86, switching transistors 87, 88 and 89, resisters 90, 91, 92 and 93 and an output terminal 94.

The monostable element 76 feeds sharp pulses every two shift pulses to the supplementary register 37'. And the carrier wave generator 86 generates sine waves the frequency of which is equal to one half of the frequency of said shift pulses.

When the code on the highest two bits of the supplementary register 37' is 00, in other words when both of the T bistable elements 37'–4 and 37'–3 have been reset, all the AND circuits 73, 74 and 75 never transmit any pulses, and the monostable elements 77, 78 and 79 are not triggered on. Hence, all the switching transistors are conducting. Thereafter the amplitude of the carrier waves is on the lowest level.

When the light gray code 01 appears on the T bistable elements 37'–4 and 37'–3, the T bistable element 37'–3 is set, therefore the AND circuit 73 allows a pulse which is transmitted by the monostable element 76 to go through. Therefore, the monostable element 77 is triggered on and the switching transistor 87 ceases to conduct during one cycle of the carrier wave. Therefore, the amplitude of the carrier wave increases and reaches to a certain level.

And when the dark gray code 10 appears, the T bistable element 37'–4 is set, and the AND circuit 74 allows an output pulse of the monostable element 76 to go through. Therefore the monostable element 78 is triggered on and the switching transistors 87 and 88 cease to conduct during one cycle of the carrier waves. Therefore the amplitude of the carrier waves increases to an even higher level.

And when the code 11 appears, both of the T bistable elements 37'–4 and 37'–3 are set, the AND circuit 75 allows said pulse to pass, the monostable element 79 is triggered on, and all the switching transistors 87, 88 and 89 cease to conduct, therefore the amplitude of the carrier waves reaches to the highest level.

Therefore, the carrier waves are modulated with said brightness codes, by four stages. This modulated carrier waves are transmitted alone, or mixed with other carrier waves.

The FIG. 15 shows a demodulator corresponding to the modulator 40' shown in FIG. 14.

In the FIG. 15, 47, 48, 54, 60 and 68 are the same elements which are shown in FIG. 11.

And 49', 50' and 51' are band-pass filters, 57-1, 57-2 and 57-3 are Schmitt trigger circuits, 63' is a receiving register, 95 is a delay circuit, 96, 97 and 98 are AND circuits, 99 and 100 are input logic negation indicators, 101 and 102 are OR circuits, 103 is a full-wave rectifier, 104 is a monostable element and 105 is a delay circuit.

The Schmitt trigger circuit 57-1 has the highest triggering level among those three Schmitt trigger circuits 57-1, 57-2 and 57-3, and is triggered on with the peak voltage of the carrier waves which are modulated with the code 11, and the Schmitt trigger circuit 57-2 has the intermediate triggering level among them, and is also triggered on with the peak voltage of the carrier waves corresponding to the code 10, and the Schmitt trigger circuit 57-3 has the lowest triggering level, and is further triggered on with the peak voltage of the carrier waves corresponding to the code 01.

The preset time of the delay circuit 95 is equal to about a quarter cycle of the carrier wave.

The output waves of the band-pass filter trigger on the monostable element 104 after being rectified by means of the full-wave rectifier 103.

The monostable element 104 transmits a sharp pulse train the frequency of which is two times higher than the frequency of the carrier waves.

And, the output pulses of the monostable element 104 are used as the shift pulses for the receiving register 63'.

The carrier waves carrying the code 00 do not trigger on any Schmitt trigger circuits, in this case, the code 00 is stored on the lowest two digits of the receiving register 63', through the OR circuits 101 and 102.

The carrier waves carrying the code 01 do not trigger on the Schmitt trigger circuits 57-1 and 57-2 but the Schmitt trigger circuit 57-3, and the output pulse of the Schmitt trigger circuit 57-3 is inputed to and stored on the lowest digit of the receiving register 63' through the AND circuit 98 and the OR circuit 102.

The carrier waves carrying the code 10 do not trigger on the Schmitt circuit 57-1 but the Schmitt trigger circuits 57-2 and 57-3, and the output of the Schmitt trigger circuit 57-2 is inputed to and stored on the second digit of the receiving register 63' through the AND circuit 97 and the OR circuit 101, but the output of the Schmitt trigger circuit 57-3 can not go through the AND circuit 98, therefore, the code 10 is stored on the lowest two digit of the receiving register 63'.

The carrier waves carrying the code 11 trigger on all the Schmitt trigger circuits 57-1, 57-2 and 57-3, and the output of the Schmitt triger circuit 57-1 is inputed to and stored on the lowest two digits of the receiving register 63' through the AND circuit 96 and both the OR circuits 101 and 102.

After said demodulation and storing are carried out, the monostable element 104 gives two shift pulses to the receiving register 63', thereafter next demodulation and storing are carried out, thereby the receiving register 63' fills up with the received codes, within said one frame of time.

The moment all the receiving registers fill up, all the stored codes on these receiving registers are removed to the final register, by abovementioned means that is shown in FIG. 11, and transmitted to the desired regenerator.

FIG. 16 shows a telecommunication system which is able to use to carry on the data-communications together with the bi-directional conversation by telephone, through the common telephone line.

In FIG. 16, reference numeral 106 designates a transmitter, 107 a receiver, 108 a telephone line, 109 a regenerator, and 110 and 111 telephone receiving circuits.

Transmitter 106 is composed of a timing pulse generator 112, a signal pulse generator 113, a modulator 114, a telephone transmitter 115, band-pass filters 116 and 117 and a mixing circuit 118.

The modulator 114 is composed of a carrier wave generator 114-1, a monostable element 14-2, an output logic negation indicator 114-3, a switching transistor 114-4, and resistors 114-5 and 114-6.

The operations of the timing pulse generator 112, the signal pulse generator 113 and the modulator 114 are similar to the operations of the above-mentioned devices which are shown in FIG. 1 or 9.

The receiver 107 consists of an amplifier 119, band-pass filters 120 and 121, a monostable element 122, and a telephone receiver 123.

Figure 17:
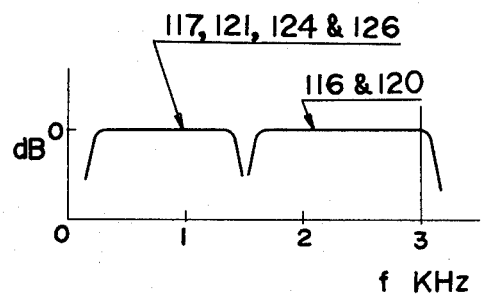
FIG. 17 is a graph which shows the dB/frequency characteristics of the band-pass filters which might be used in the said communication system shown in FIG. 16.

The band-pass filters 116, 117, 120, 121, 124 and 126 have the dB/frequency characteristics which are shown in FIG. 17, respectively. It is recommended to set the upper cut-off frequency and the lower cut-off frequency of the band-pass filters 116 and 120 at 3,000 Hz and 1,600 Hz respectively, and the upper cut-off frequency off the band-pass filters 117, 121, 124 and 126 at 1,500 Hz.

Usually, the telephone lines have their band-pass filters which have a of 300 Hz and an upper cut-off frequency of 3,000 Hz.

But, if the frequency band for a conversation is restricted within the range of 300 to 1,500 Hz, the telephonic communications are still within the range of possibility.

The audio signals are bi-directionally transmitted from the telephone transmitter 115 to telephone receiver 123 and from the telephone transmitter 125 to the telephone receiver 127, while the signal pulses which are generated by the signal pulse generator 113 are modulated by the modulator 114, transmitted to the receiver 107 through the telephone line 108, demodulated by the monostable element 122, and supplied to the regenerator 109.

This communication system is suitable for a facsimile or a visual telephone.

Figure 18:
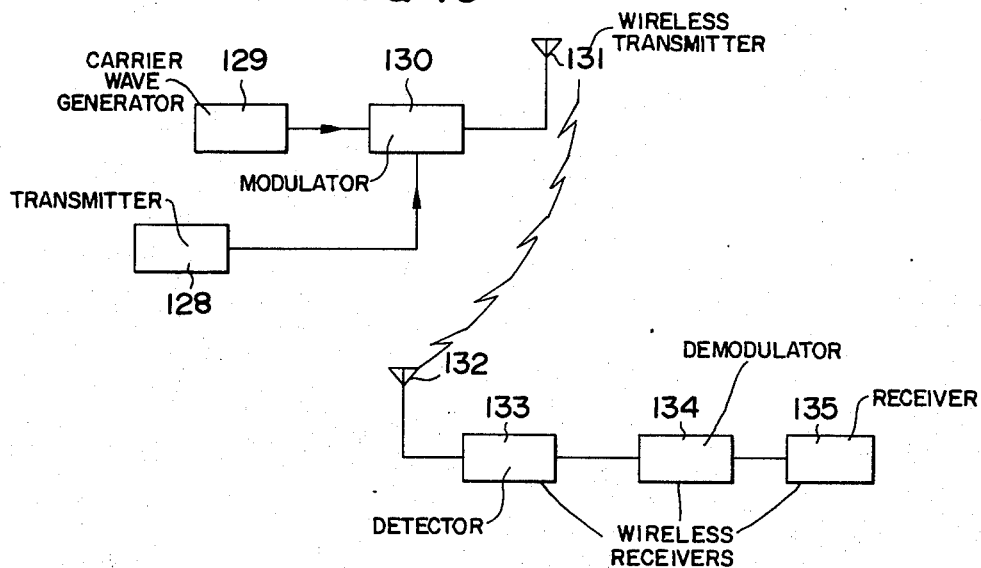
FIG. 18 is a schematic diagram of a data communication system by wireless in accordance with the invention.

FIG. 18 shows a wireless communication system in accordance with one embodiment of the invention. In FIG. 18, 128 is a transmitter or a modulator which is similar to the transmitter or the modulator shown in FIG. 1, 9, 14 or 16, 129 is a radio carrier wave generator, 130 is a well known modulator 131 is a transmitting antenna, 132 is a receiving antenna, 133 is a detector, 134 is a well known demodulator, and 135 is a receiver or a demodulator which is similar to the receiver or the demodulator shown in the FIG. 1, 11, 15 or 16.

The well known modulation method for broadcasting, amplitude modulation, frequency modulation, phase modulation, etc., are applicable to this communication system.

This communication system is suitable for a wireless facsimile and a slow scanning television for a radio ham.

Since binary signals often represent "0" by the absence of a pulse and 1 by the presence of a pulse, it is understood that the word "signal" in such a context is broad enough to include the absence of an electrical current or potential as well as the presence of such current or potential.

The disclosed embodiments are representative of presently preferred forms of the invention, but are intended to be illustrative rather than definitive thereof. The invention is defined in the claims.

What I claim is:

1. A method of telecommunication comprising providing a plurality of separate carrier waves of different frequency, providing a train of binary signals, dividing said binary signals into groups, one group for each of said plurality of carrier waves, the ratio of the frequency of a carrier wave to the number of binary signals in the group that is complementary to that particular carrier wave being the same for each carrier wave and its complementary group of binary signals, amplitude modulating each carrier wave according to its complementary group of binary signals with the amplitude of at least a part of each cycle of each carrier wave representing one binary signal, transmitting said modulated carrier waves to a receiving location, demodulating, at the receiving location, each carrier wave to extract therefrom the group of binary signals that it carried, to thereby provide a plurality of separate groups of binary signals, and combining the separate groups of binary signals to reconstruct the first-named train of binary signals.

2. A method of telecommunication as defined in claim 1 in which the groups of binary signals that were divided out of said train of binary signals are temporarily stored and the aforesaid stored signals are used to modulate the carrier waves.

3. The method of telecommunication as defined in claim 2 in which at the receiving location the plurality of separate groups of binary signals are temporarily stored, and are thereafter combined to reconstruct the first-named train of binary signals.

4. A method of telecommunication as defined in claim 1 in which a frame of binary signals of the train, equal to the total of the binary signals in the plurality of groups, is temporarily stored before the signals are divided into said groups.

5. A method of telecommunication as defined in claim 4 in which a new frame of binary signals is temporarily stored after the preceding frame has been divided, said groups which make up said preceding frame being temporarily stored while said new frame is temporarily stored and being applied to modulate their complementary carrier waves at the conclusion of their temporary storage.

6. A method of telecommunication as defined in claim 1 in which:

said separate carrier waves are each alternating current waves, said step of amplitude modulating said waves comprising varying the amplitude without changing the polarity of portions of the carrier waves.

7. A method of telecommunications as defined in claim 1 in which:

said train of binary signals representing intelligence of varying amplitude, said binary signals including at least three different forms of binary signals respectively representing at least three different amplitudes any one of which amplitudes may appear in said intelligence, each group of binary signals amplitude modulating its complementary carrier wave so that each cycle of that wave transmits in modulated form a signal the amplitude of which indicates which one of said forms of binary signals modulate said cycle.

8. In a signaling system a. an alternating current carrier wave generator, b. a timing pulse generator, c. said timing pulse generator and said carrier wave generator being synchronized so that the timing pulse generator produces one pulse for each cycle of the alternating current carrier wave, d. signal generating means synchronized with said timing pulse generator for producing a signal representing one of at least three digits during each cycle of said alternating current carrier wave, and e. means responsive to each signal that represents a digit for determining the amplitude of at least a part of the cycle, of said alternating current carrier wave, during which the signal occurs.

9. A signaling system as defined in claim 8, in which said signal generating means provides more than two signal amplitudes to thereby provide at least three levels of amplitude modulation for said carrier wave generator.

10. In a signaling system, a. a signal pulse generator for producing binary signals containing information, b. a first register for storing a train of said binary signals, c. a second register for storing a plurality of binary signals, d. additional register means for storing a larger number of digits than the second register, e. the total digit storage capacity of the second register and the additional register means equalling the digit storage capacity of the first register, f. read-out means for reading binary signals out of said first register into the other registers, g. means for filling the first register with said binary signals after each operation of said read-out means, h. a generator for producing a first carrier wave, i. means for reading-out the signals in said second register and for modulating said first carrier wave in accordance with the binary signals in the second register, and j. additional carrier wave generator means, and k. means for reading-out the signals in said additional register means and modulating the output of said additional carrier wave generator means in accordance therewith.

11. In a signaling system as defined in claim 10, a demodulator comprising:

a. one register having the same digit capacity as said second register, b. another register means having the same digit capacity as said additional register means, c. means for demodulating said carrier waves and producing binary signals according to such modulation and applying the binary signals from the first carrier wave to fill said one register, and for applying the binary signals according to the modulation on said additional carrier wave generator means to fill said another register means, d. an output register having the same digit capacity as said first register, e. means for reading-out the binary signals in said one register and said another register means into said output register, and f. means for reconstructing said first-named binary signals, that were fed into said first register, from the signals in said output register.

12. In a signaling system as defined in claim 10, the ratio of the frequency of said first carrier wave to the binary signal storage capacity of the second register being equal to the ratio of the frequency of said additional carrier wave generator means to the binary signal storage capacity of said additional register means.

13. A method of telecommunication comprising
providing a plurality of separate carrier waves of different frequency,
providing a train of binary signals,
dividing said binary signals into groups, one group for each of said plurality of carrier waves,
modulating each carrier wave according to its complementary group of binary signals with each cycle of each carrier wave representing a binary signal,
transmitting said modulated carrier waves to a receiving location,
demodulating, at the receiving location, each carrier wave to extract therefrom the group of binary signals that it carried, to thereby provide a plurality of separate groups of binary signals, and
combining the separate groups of binary signals to reconstruct the first-named train of binary signals.

14. A method of telecommunication as defined in claim 13 in which said step of modulating each carrier wave comprises the step of amplitude modulating each carrier wave according to its complementary group of binary signals, with the amplitude of at least a part of each cycle of each carrier wave representing one binary signal.

15. A method of telecommunication as defined in claim 13 in which the ratio of the frequency of a carrier wave to the number of binary signals in the group that is complementary to that particular carrier wave is the same for each carrier wave and its complementary group of binary signals.

16. A method of telecommunication as defined in claim 13 in which the train of binary signals is divided into frames,
sucessively temporarily storing each frame, and
performing said step of "dividing said binary signals into groups, one group for each of said plurality of carrier waves" upon each temporarily stored frame, to thus successively produce said groups of binary signals for each frame.

17. A method of telecommunication as defined in claim 16 in which the ratio of the frequency of a carrier wave to the number of binary signals in the group that is complementary to that particular carrier wave is the same for each carrier wave and its complementary group of binary signals,
each of said successively produced group of binary signals having its binary signals occurring at the same rate as the frequency of its complementary carrier wave, and
each cycle of each carrier wave being synchronized with and being modulated to represent one of said binary signals.

18. A method of telecommunications from a transmitting location to a receiving location, comprising:
producing a train of binary signals,
transmitting, from the transmitting location, a plurality of carrier waves the sum of the frequencies of which equals the repetition rate of the binary signals of said train,
modulating each of said carrier waves with said binary signals so that each cycle of each carrier wave represents one of the binary signals of said train,
receiving said modulated carrier waves at the receiving location,
separately demodulating each of the plural carrier waves to extract its binary signals therefrom, and
combining the binary signals extracted from the plural carrier waves to reconstruct the original train of binary signals.

* * * * *